(12) United States Patent
Ortlund et al.

(10) Patent No.: US 9,132,485 B2
(45) Date of Patent: Sep. 15, 2015

(54) EXCHANGEABLE INSERT SEAT MEMBER FOR CUTTING TOOL

(71) Applicant: SANDVIK INTELLECTUAL PROPERTY AB, Sandviken (SE)

(72) Inventors: Magnus Ortlund, Danderyd (SE); Stefan Sander, Huddinge (SE); Jeremy Schmitt, Tours (FR)

(73) Assignee: Sandvik Intellectual Property AB, Sandviken (SE)

( * ) Notice: Subject to any disclaimer, the term of this patent is extended or adjusted under 35 U.S.C. 154(b) by 136 days.

(21) Appl. No.: 13/682,861

(22) Filed: Nov. 21, 2012

(65) Prior Publication Data

US 2013/0129435 A1    May 23, 2013

(30) Foreign Application Priority Data

Nov. 23, 2011 (EP) .................................... 11190334

(51) Int. Cl.
| | |
|---|---|
| *B23C 5/22* | (2006.01) |
| *B23B 27/16* | (2006.01) |
| *B23C 5/10* | (2006.01) |
| *B22F 5/10* | (2006.01) |
| *B22F 3/22* | (2006.01) |
| *B22F 5/00* | (2006.01) |

(52) U.S. Cl.
CPC . *B23B 27/16* (2013.01); *B22F 5/10* (2013.01); *B23C 5/109* (2013.01); *B23C 5/22* (2013.01); *B23C 5/2226* (2013.01); *B22F 3/225* (2013.01); *B22F 2005/001* (2013.01); *B23C 2210/02* (2013.01); *B23C 2210/166* (2013.01); *B23C 2210/168* (2013.01); *Y10T 407/227* (2015.01); *Y10T 407/2208* (2015.01)

(58) Field of Classification Search
CPC .............. B23B 27/16; B23C 2210/168; B23C 2210/166
USPC ............ 407/101, 40, 46, 47, 51, 102, 103, 70
See application file for complete search history.

(56) References Cited

U.S. PATENT DOCUMENTS

| | | | | | |
|---|---|---|---|---|---|
| 2,546,455 | A | * | 3/1951 | Labrozzi et al. ................. | 407/10 |
| 2,697,272 | A | * | 12/1954 | Clark .................................. | 407/5 |
| 3,163,919 | A | * | 1/1965 | Turner ............................. | 407/38 |
| 3,490,117 | A | * | 1/1970 | Hertel ............................ | 407/104 |
| 3,701,187 | A | * | 10/1972 | Erkfritz .......................... | 407/46 |
| 3,825,981 | A | * | 7/1974 | Cochran et al. ................ | 407/101 |

(Continued)

FOREIGN PATENT DOCUMENTS

| | | |
|---|---|---|
| DE | 19832551 A1 | 1/2000 |
| EP | 443773 A2 | 8/1991 |

(Continued)

*Primary Examiner* — Sunil K Singh
*Assistant Examiner* — Sara Addisu
(74) *Attorney, Agent, or Firm* — Corinne R. Gorski (57) ABSTRACT

The present invention relates to an exchangeable insert seat member for a metal cutting tool having a tool body and a cutting insert. The exchangeable insert seat member is arranged to be placed between the tool body and the cutting insert, wherein the exchangeable insert seat member contacts the tool body. The cutting insert at contact areas is arranged such that there is no direct contact between the tool body and the cutting insert and wherein the exchangeable insert seat member is produced by powder injection molding. The present invention also relates to a metal cutting tool having the exchangeable insert seat member.

12 Claims, 4 Drawing Sheets

(56) References Cited

U.S. PATENT DOCUMENTS

| | | | |
|---|---|---|---|
| 4,066,376 A * | 1/1978 | Eckle et al. | 407/101 |
| 4,318,647 A * | 3/1982 | Erkfritz | 408/153 |
| 5,163,788 A * | 11/1992 | Dahl et al. | 407/46 |
| 5,536,119 A * | 7/1996 | Werner et al. | 407/36 |
| 5,627,258 A * | 5/1997 | Takayama et al. | 528/338 |
| 5,676,505 A * | 10/1997 | Gauss et al. | 409/132 |
| 5,738,468 A * | 4/1998 | Boianjiu | 407/103 |
| 5,800,079 A * | 9/1998 | Qvarth | 407/46 |
| 5,836,724 A | 11/1998 | Satran | |
| 5,868,530 A * | 2/1999 | Shouse | 407/101 |
| 6,004,080 A * | 12/1999 | Qvarth et al. | 407/36 |
| 6,186,704 B1 * | 2/2001 | Hale | 407/101 |
| 6,273,649 B1 * | 8/2001 | Ziegler | 407/101 |
| 6,286,406 B1 | 9/2001 | Viswanadham | |
| 6,325,574 B1 * | 12/2001 | Treige | 407/35 |
| 6,971,823 B2 * | 12/2005 | Satran et al. | 407/46 |
| 7,118,311 B2 * | 10/2006 | Astrom | 407/46 |
| 8,109,699 B2 * | 2/2012 | Chen | 407/46 |
| 8,475,090 B2 * | 7/2013 | Mergenthaler et al. | 408/1 R |
| 8,696,258 B2 * | 4/2014 | Choi et al. | 407/46 |
| 2007/0256287 A1 * | 11/2007 | Kocherovsky et al. | 29/428 |
| 2009/0196701 A1 * | 8/2009 | Wihlborg et al. | 408/230 |
| 2010/0034607 A1 * | 2/2010 | Meyer et al. | 408/189 |
| 2011/0110732 A1 * | 5/2011 | Elbaz et al. | 407/101 |
| 2011/0188951 A1 * | 8/2011 | Mergenthaler | 407/44 |
| 2013/0279995 A1 * | 10/2013 | Hecht | 407/101 |

FOREIGN PATENT DOCUMENTS

| | | | |
|---|---|---|---|
| JP | 62088508 A * | 4/1987 | |
| JP | 2001315014 | 11/2001 | |
| WO | 2009069836 A1 | 6/2009 | |

* cited by examiner

EXCHANGEABLE INSERT SEAT MEMBER FOR CUTTING TOOL

RELATED APPLICATION DATA

This application claims priority under 35 U.S.C. §119 to European Patent Application No. 11190334.0, filed on Nov. 23, 2011, which the entirety thereof is incorporated herein by reference.

TECHNICAL FIELD

The present invention relates to an exchangeable insert seat member for a metal cutting tool, wherein the exchangeable insert seat member is arranged to be placed between a tool body of said cutting tool and a cutting insert. The present invention also relates to a metal cutting tool comprising such an exchangeable insert seat member.

BACKGROUND

Cutting inserts are typically used for chip removing metal cutting operations, such as turning, milling or drilling operations. In many cases, a cemented carbide shim is interposed between the cutting insert and a bottom wall of a tool holder pocket. The shim is then serving to protect the tool holder pocket from excessive wear or damage through use. Embossing of the cutting insert into the tool surface is one of the prevented wear mechanisms. In some cases where shims are employed together with screw fastened cutting inserts, the shim is retained in position in the pocket by means of a special screw arranged with an internal screw threading. The special screw fastens the shim to the tool body while the internal screw threading is adapted for the fastening of the cutting insert. The screw used to secure the cutting insert is arranged to pass through the bore of the cutting insert and to engage with the internal threading of the special screw. The shims are typically designed to be directly secured to the bottom wall of the tool holder. The cutting insert facing surface of the shim provides support for the bottom side of the cutting insert.

The cutting inserts are typically manufactured from a particularly hard and wear-resistant material, such as sintered cemented carbide, ceramics, etc. The tool holder body is typically manufactured from a more elastic material, in particular steel. To protect the tool holder pocket from excessive wear or damage, the shim is usually manufactured from a wear-resistant material with high hardness such as cemented carbide. The shim is typically face grinded to a flat and plane-parallel geometry.

The presence of the screw aperture in the shim decreases its largest possible supporting contact area with the cutting insert, and the larger the screw opening the less the possible area of contact between the shim and the cutting insert. There is a demand for smaller and smaller cutting inserts for production of minimal, narrow and advanced products. The holding of small cutting inserts with shims in a tool body is a problem due to the reduced area of contact between the shim and the cutting insert and there is a constant need of rigid fastening arrangements during cutting operations.

Stable and rigid holding of cutting inserts is a crucial issue to reduce the risk of rupture or breakage of the cutting insert. The precision of the holding is of great importance in the cutting operations and is necessary in the production of a final product with small tolerances.

DESCRIPTION OF THE INVENTION

An object of the present invention is to provide an improved exchangeable insert seat member for a cutting insert mounted on a cutting tool. Another object of the present invention is to provide an exchangeable insert seat member that is adapted for advanced insert geometries, for example an exchangeable insert seat member adapted for an insert geometry which seat is difficult and therefore also expensive or even impossible to produce by traditional cutting insert seat producing operations. Another object is to improve the accuracy in the positioning of a cutting insert and further another object is to prolong the life time of the tool body The present invention relates to an exchangeable insert seat member for a metal cutting tool, wherein the exchangeable insert seat member is arranged to be placed between a tool body of said cutting tool and a cutting insert such that said exchangeable insert seat member is contacting said tool body and said cutting insert at contact areas arranged such that there is no direct contact between the tool body and the cutting insert, and wherein said exchangeable insert seat member is produced by powder injection molding.

The exchangeable insert seat member of the present invention is produced by a powder injection molding technique known per se. In powder metallurgy, injection molding is used for the production of relatively complex details of metallic or ceramic powder, such as cemented carbide powder. The cemented carbide powder is typically milled and mixed with polymers. After a molding process, the polymer is removed; whereafter the detail is sintered in substantially the same way as for corresponding tool-pressed details. Powder injection molding (PIM) can be divided into metal injection molding (MIM) and ceramic injection molding (CIM) based on what material that is molded.

An advantage with the powder injection molding technique is the high freedom of shape of the produced detail. The shape is not restricted to what is machinable or geometrically accessible for a machining tool. Furthermore the surface finish after sintering of an injection molded piece can be of such a quality that no subsequent polishing step necessarily is needed. Polishing steps are always expensive and often time-consuming.

An aspect of the present invention is that the exchangeable insert seat member can be produced to support the cutting insert on both the bottom side and the sides of the cutting insert. Due to the high freedom in geometry of powder injection molded pieces, the cutting insert supporting surfaces of the exchangeable insert seat member can be adjusted in geometry to form fit any cutting insert. The area of contact between the cutting insert and the exchangeable insert seat member, is no longer predefined to be located at the plane areas of the cutting insert, but can be designed to be adapted for the specific cutting insert geometry. An increased amount of contact area between the cutting insert and the exchangeable insert seat member can result in an improved stability and a more secure holding of the cutting insert, especially when the cutting insert is of a small size and/or of a complex geometry.

An increased amount of supporting area implies a lower average contact pressure between the cutting insert and the exchangeable insert seat member. When the contact pressure is high enough, material will plastically deform, for example with embossing or plastic deformation of the cutting insert into the surface of the exchangeable insert seat member. With a lower average contact pressure, the risk for plastic deformation or embossing of the exchangeable insert seat member and also of the tool body can be decreased.

The exchangeable insert seat member of the present invention can be produced of any suitable material that can be produced by powder injection molding (PIM). PIM-products are advantageous in that the grain size and impurities of the final product can be controlled and thus high performance material properties achieved.

In one embodiment the exchangeable insert seat member is produced with metal injection molding (MIM), where a metal powder is used. Said exchangeable insert seat member can for example be manufactured of cemented carbide or of a tungsten alloy, for example Plansee Densimet®. Another example of material is a cobalt based alloy, for example Deloro Stellite®. In one embodiment of the present invention the exchangeable insert seat member is made of a material comprising at least one selected from a group of Ni, Co, Cr, W, Mo and Fe.

Due to that the exchangeable insert seat member is arranged in between the tool body and the cutting insert such that there is no direct contact between the tool body and the cutting insert, the exchangeable insert seat member can contribute to a vibration dampening effect. The material and/or design of the exchangeable insert seat member can be chosen based on its vibration dampening ability.

In one embodiment of the invention the exchangeable insert seat member comprises one single piece. One advantage with one single piece is that the exchangeable insert seat member is simple to handle and easy to exchange, especially when adapted to a cutting insert of a small size. Another advantage with a single piece exchangeable insert seat member is that the exchangeable insert seat member can be designed such that the fastening of the exchangeable insert seat member does not have to interfere with the fastening of the cutting insert. The fastening of the exchangeable insert seat member to the tool body can be located at a distance from the cutting insert, i.e. no need of the quite expensive screws with internal threading.

In one embodiment of the present invention, the exchangeable insert seat member is arranged for supporting a cutting insert where an inscribed circle of said cutting insert has a diameter of ≤8 mm. Cutting inserts of this size are considered small and particularly difficult to hold in a stable and controlled way due to the lack of available plane areas at the bottom side of the cutting insert and therefore lack of possible contact areas when using a traditional plane shim. With an exchangeable insert seat member according to the present invention the area of contact between the cutting insert and the exchangeable insert seat member can be increased such that the holding becomes rigid and stable. This is due to that the powder injection molding techniques allow production of complicated geometries with a high precision, irrespective of size.

In one embodiment of the invention, the exchangeable insert seat member is arranged with a supporting surface for supporting a cutting insert, and where at least one part of the supporting surface is non-planar. In another embodiment of the present invention, the exchangeable insert seat member is arranged with at least two supporting surfaces for supporting of a cutting insert, and wherein at least one part each of said two supporting surfaces is non-planar. This is advantageous especially for cutting insert geometries comprising non-planar outer surfaces. The exchangeable insert seat member can be formed at least partly as a negative copy of an outer surface geometry of the cutting insert. Thereby the contact area between the exchangeable insert seat member and the cutting insert can be increased and thus the holding precision and stability increased. This also results in a higher freedom in the cutting insert geometry design since the cutting insert no longer has to be designed such that the supporting areas need to be plane.

The exchangeable insert seat member according to the present invention can in one embodiment be produced such that the insert seat has a geometrical shape that is a negative or inverse geometrical shape complementary to the shape of the cutting insert. The amount of supporting area with form fit can for example be adjusted depending on the hardness of the exchangeable insert seat member material, the higher hardness of the material, the less supporting area with form fit is needed.

In another embodiment of the present invention, the exchangeable insert seat member is adapted for supporting at least one double positive cutting insert. This is advantageous due to that double positive cutting inserts usually comprises side support surfaces which are inclined in relation to both its bottom support surface and its top support surface.

In one embodiment the exchangeable insert seat member is at least partly coated by a surface coating. A surface coating can for example be a thin film coating applied with a CVD or PVD technique or any other available coating technique known in the art. A surface coating can for example improve the wear resistance of the exchangeable insert seat member, or improve the visual appearance of it.

In another embodiment of the invention, said exchangeable insert seat member is arranged for support of at least two cutting inserts. The exchangeable insert seat member can alternatively be arranged for more than two cutting inserts. The exchangeable insert seat member can comprise a body extending across the diameter of a tool body and be arranged to be fixed thereto. In another embodiment all the cutting inserts of the cutting tool can be arranged in the same exchangeable insert seat member.

In another embodiment of the invention, the exchangeable insert seat member can constitute the front portion of the tool body. This is advantageous in that the front portion can protect the tool body from wear. Another advantage with a front portion made with powder injection moulding is that the production time can be reduced since the time of machining the tool body is reduced and simplified whereby time and money can be saved.

The present invention also discloses a metal cutting tool comprising a tool body having a recess which comprises a seat for an exchangeable insert seat member, an exchangeable insert seat member according to the invention mounted in said recess and a cutting insert mounted in said exchangeable insert seat member.

In one embodiment of the cutting tool according to the present invention the areas between the exchangeable insert seat member and the recess are planar. An advantage with planar surfaces is that the production is straight forward and relatively simple.

In another embodiment of the cutting tool according to present invention said cutting insert and said exchangeable insert seat member are connected such that the areas of contact between them are located at three separated areas such that the cutting insert is supported in three different directions. This is advantageous to the stability of the mounted cutting insert.

DESCRIPTION OF DRAWINGS

The invention will now be disclosed in more detail via preferred embodiments with reference to the drawings in which.

DETAILED DESCRIPTION OF THE INVENTION

Figures 1, 2:
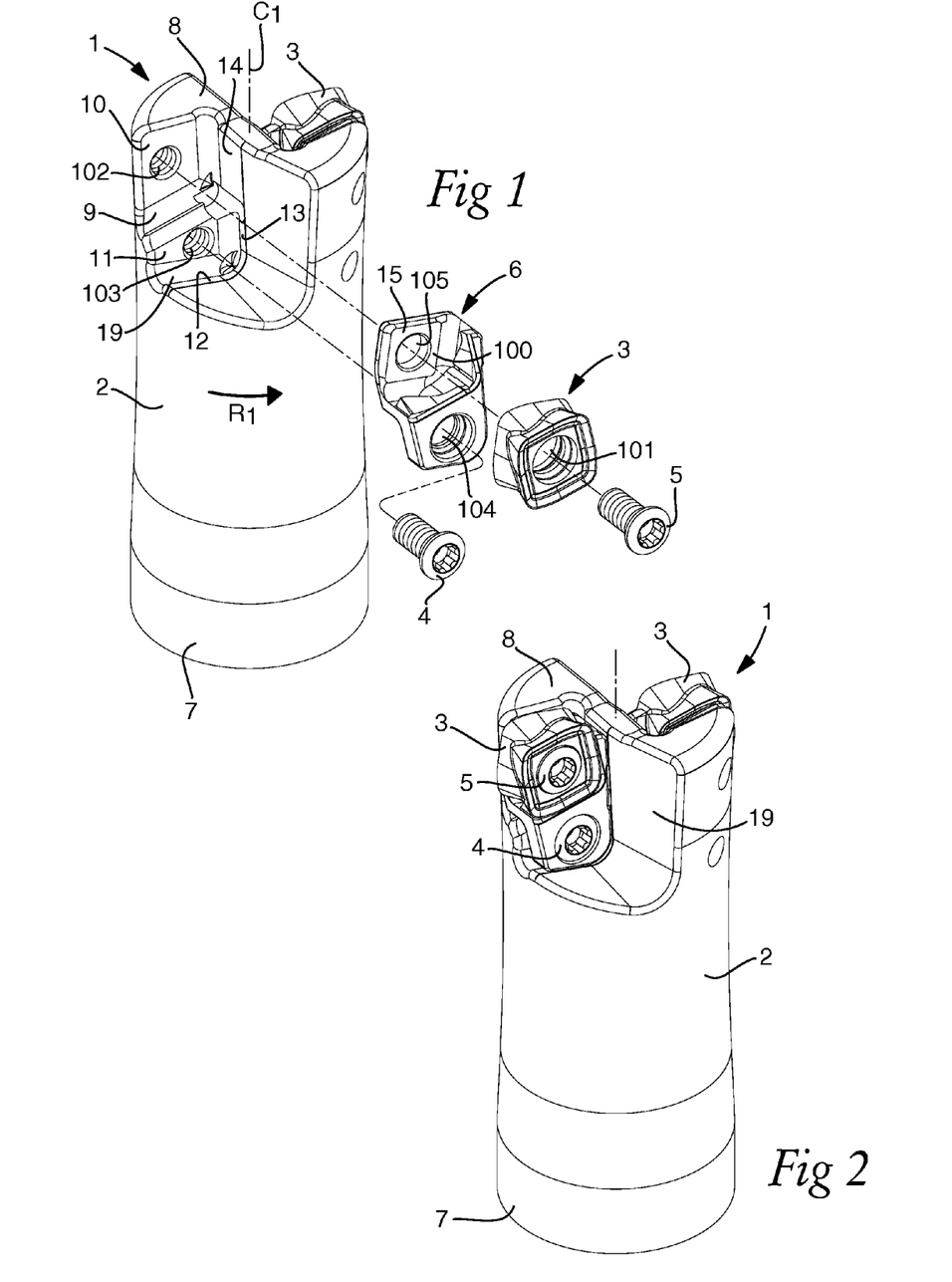
FIG. 1 is a schematic exploded perspective view of an exemplifying embodiment of a metal cutting tool according to the invention, showing a cutting insert exchangeable insert seat member separated from a tool body and a cutting insert.
FIG. 2 is a schematic perspective view of the metal cutting tool shown in FIG. 1, showing the cutting inserts and the exchangeable insert seat members fastened with screws.
Figure 3:
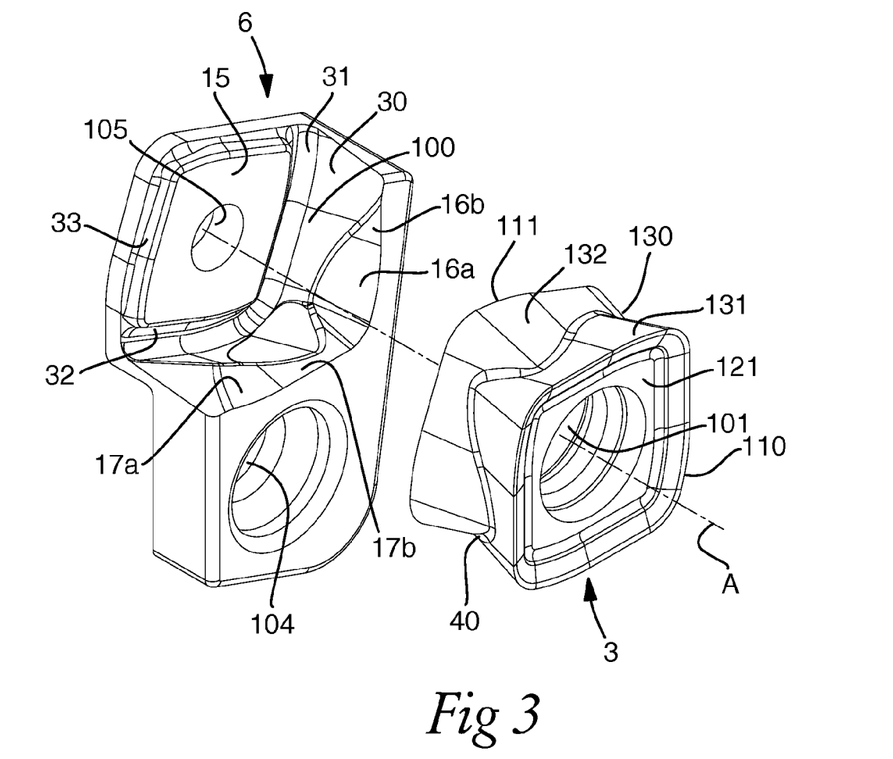
FIG. 3 is a schematic exploded perspective view of the cutting insert and the exchangeable insert seat member shown in FIG. 1 and FIG. 2.

FIG. 1 and FIG. 2 discloses a metal cutting tool 1 of a first embodiment according to the invention. The metal cutting tool 1 is in this embodiment a milling tool configured to be used for chip-removing machining of work pieces, especially of metallic materials, such as steel, aluminum, etc. The milling tool includes a tool body 2, cutting inserts 3, exchangeable insert seat members 6 and screws 4, 5 for fastening the cutting inserts 3 and the insert seat member 6. FIG. 3 is a close-up view of an insert seat member 6 and a cutting insert 3 shown in FIG. 1 and FIG. 2.

The tool body 2 comprises a rear shaft portion 7 which is arranged to be connected to a tool holder in a milling machine. The tool body is configured to rotate in a rotary direction R1 around an axis C1 of rotation also forming a longitudinal center axis of the tool body 1. The tool body 2 further comprises a front portion 8 opposite to the rear shaft portion 7 along longitudinal center axis C1 of the tool body 2.

The milling tool comprises a plurality of cutting inserts 3 and insert seat members 6 which are mounted to the tool body 1. The cutting inserts 3 and the insert seat members 6 are replaceable. The cutting inserts 3 are manufactured in a harder material than the tool body 2, such as hard metal, cemented carbide, ceramics, etc. The insert seat members 6 are manufactured with powder injection molding of a material harder than the tool body 2, such as hard metal, cemented carbide, ceramics, etc. The tool body 2 may be manufactured in steel.

The tool body 2 comprises a plurality of recesses 19 each configured to house a respective one of the insert seat members 6 and a respective one of the cutting inserts 3. In the embodiment disclosed in FIGS. 1 to 3, the milling tool comprises two cutting inserts 3 and two insert seat members 6. It is to be noted that the milling tool may comprise less or more than two cutting inserts 3 and two recesses 9, for example three, four, five, six, seven, eight etc. cutting inserts and recesses and that an insert seat member 6 can be placed in each recess 9.

Each recess 19 comprises a seat 9 for the insert seat member 6. The seat 9 is configured to form a support for the insert seat member. As can be seen in FIG. 1, where one of the cutting inserts and the corresponding insert seat member is illustrated beside the seat, the seat comprises two bottom surfaces 10, 11, a main side support surface 14 and two minor side support surface 12, 13. The bottom support surface 10 is defined by a plane that is mainly parallel to the plane of the bottom support surface 11. The side support surfaces 12, 13, 14 are upstanding relatively to the bottom support surfaces 10, 11. The side support surface 12 is mainly perpendicular to the side support surfaces 13, 14.

In FIG. 2 each insert seat member 6 is secured in the respective seat 9 by means of a fastening screw 4 extending through a hole 104 in the insert seat member 6 and, see FIGS. 1 and 3, into a fastening hole 103 through the bottom support surface 11. The bottom side (not shown) of the insert seat member 6 is formed such that when the insert seat member 6 is secured at the tool body 2, the insert seat member 6 is in contact with the seat 9 at the support surfaces 10, 11, 12, 13, 14 of the seat 9.

Each insert seat member 6 shown in FIGS. 1 to 3 is adapted to support one cutting insert 3. The insert seat member 6 comprises a first hole 104, a second hole 105, an insert seat 100 comprising a bottom support surface 15, side support surfaces 16a, 16b, 17a, 17b and several clearance surfaces 30, 31, 32, 33. The insert seat 100 is geometrically formed to support the cutting insert 3 in position. The first hole 104 is arranged separate from the insert seat 100, for fastening of the insert seat member 6 at the tool body 2 via a fastening screw 4 extending there through.

The cutting insert 3 shown in FIGS. 1 to 6, and in detail in FIG. 3, is a double positive cutting insert comprising a top surface 121, a bottom surface (not shown) and an edge side surface 130 connecting the top surface 121 and the bottom surface. The transition between the top surface 121 and the edge surface 130 defines an upper cutting edge 110, while the transition between the bottom surface of the cutting insert and the side surface 130 defines a lower cutting edge 111. The cutting insert 3 comprises the upper cutting edge 110, the lower cutting edge 111 and a center hole 101 extending through the cutting insert 3. The edge side surface 130 extends around the cutting insert 3. The edge side surface 130 comprises a transition portion 40 extending around the cutting insert 3 and dividing the edge side surface 130 into an upper side portion 131 and a lower side portion 132. The upper side portion 131 is associated with, or connected to, the upper cutting edge 110. The lower side portion 132 is associated with or connected to the lower cutting edge 111. The cutting insert 3 is generally rectangular in top view. The upper half of the cutting insert 3, which upper half is defined by the top surface 121 and the upper side portion 131, is slightly displaced angularly with respect to the center axis A in relation to the lower half of the cutting insert 3, which lower half is defined by the bottom surface and the lower side portion 132.

The cutting insert 3 is indexable to different index positions. In one index position, the upper cutting edge 110 is cutting, wherein the top surface 121 of the cutting insert 3 forms a chip surface or rake surface and the bottom surface (not shown) of the cutting insert 3 forms a supporting surface resting on the bottom surface 15 of the seat 9.

In FIG. 2 the cutting insert 3 is secured in the respective seat 100 by means of a fastening screw 5 extending through a center hole 101 in the cutting insert 3 and the second hole 105 of the insert seat member 6, see FIGS. 1 and 3, into a fastening hole 102 in the bottom support surface 10. The cutting insert 3 is in the secured position supported at three areas located so that the cutting insert 3 is supported in three directions. The lower side of the cutting insert 3 is supported by surface 15, one portion of the upper side portion 131 of the cutting insert 3 is supported by side support surfaces 16a, 16b of the insert seat member 6 and another portion of the upper side portion 131 of the cutting insert 3 is supported by the side support surfaces 17a, 17b of the insert seat member 6. The side support surfaces of the insert seat member 6 are partly curved or non-planar 16a, 17a and partly planar 16b, 17b to fit the upper side portion 131 of the cutting insert 3, which in the corresponding way comprises planar and non-planar portions. The exchangeable insert seat member 6 comprises several areas 30, 31, 32, 33 that are free from contact with the cutting insert 3 while the cutting insert 3 is in a mounted position.

Further embodiments of the insert seat member 6 will now be described. It is to be noted that the same reference sign designate the same or a similar element in all embodiments disclosed.

Figures 4, 5:
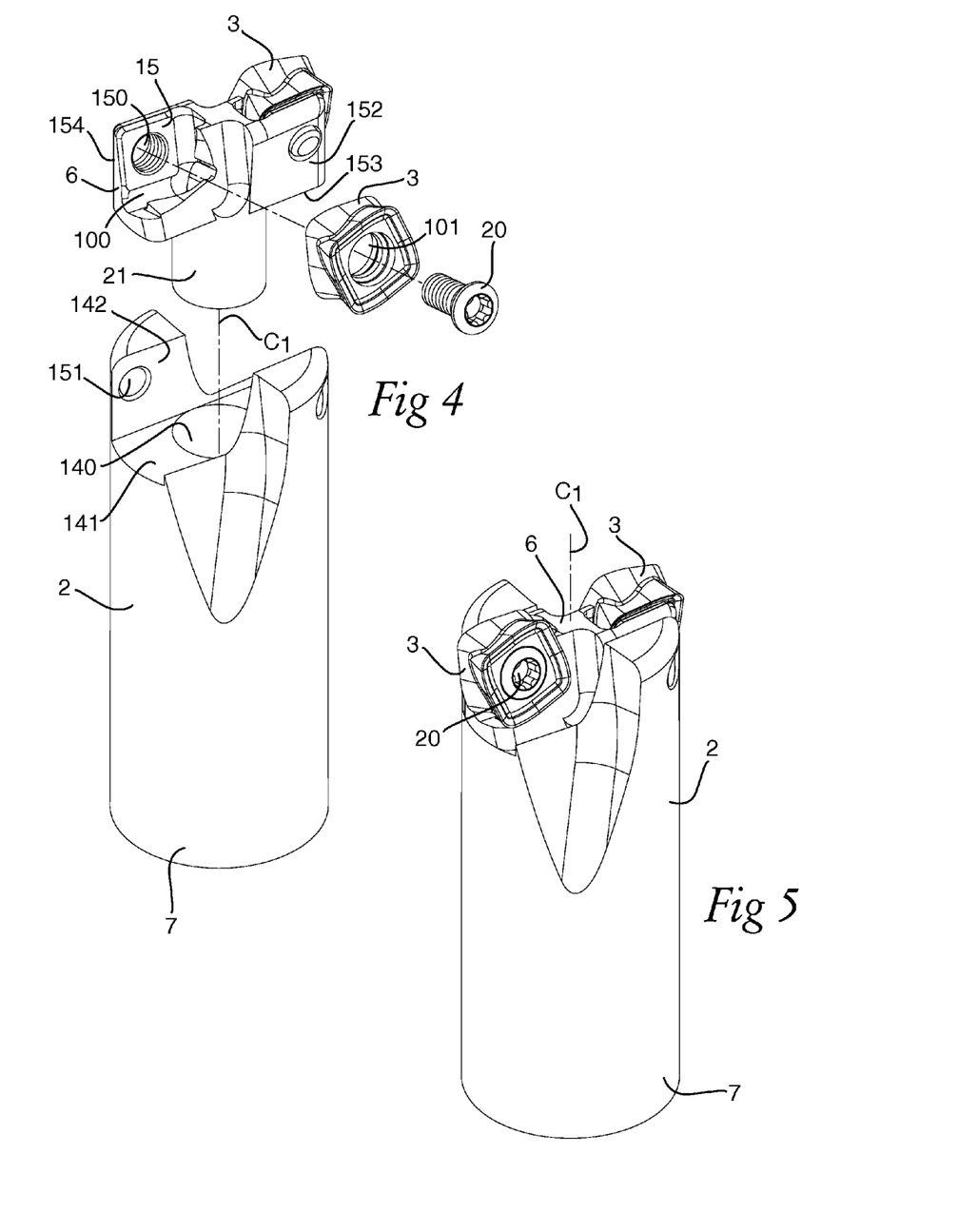
FIG. 4 is a schematic exploded perspective view of an exemplifying embodiment of an exchangeable insert seat member according to the invention, wherein the exchangeable insert seat member is arranged for supporting two cutting inserts.
FIG. 5 is a schematic perspective view of the metal cutting tool shown in FIG. 4, showing the exchangeable insert seat member and the cutting inserts in mounted position.

FIG. 4 to 5 discloses a second embodiment of the insert seat member 6 which differs from the first embodiment in that the insert seat member 6 comprises two seats 100 arranged for two respective cutting inserts 3. All the cutting inserts 3 of this cutting tool is arranged in the same insert seat member 6. The insert seat member 6 further comprises a substantially cylindrical shaft 21 protruding from the rest of the insert seat member 6. The tool body is configured to house the insert seat member 6 and a substantially cylindrical hole 140 is arranged extending along the axis C1 of rotation in the tool body 2. The tool body 2 further comprises support surfaces 141, 142 arranged to support the support surfaces 152, 153, 154 of the insert seat member 6.

In FIG. 5 the insert seat member 6 is secured to the tool body 2 and the two cutting inserts 3 are secured in the respective seat 100 of the insert seat member 6 via fastening screws 20. Each fastening screw 20 is extending through a center hole 101 in a cutting insert 3, through a hole 150 in the insert seat member 6 and into a fastening hole 151 through the support surface 142 of the tool body 2. The hole 140 is arranged to comprise the shaft 21 of the insert seat member 6 when the seat member 6 is mounted to the tool body 2 as shown in FIG. 5.

Figure 6:
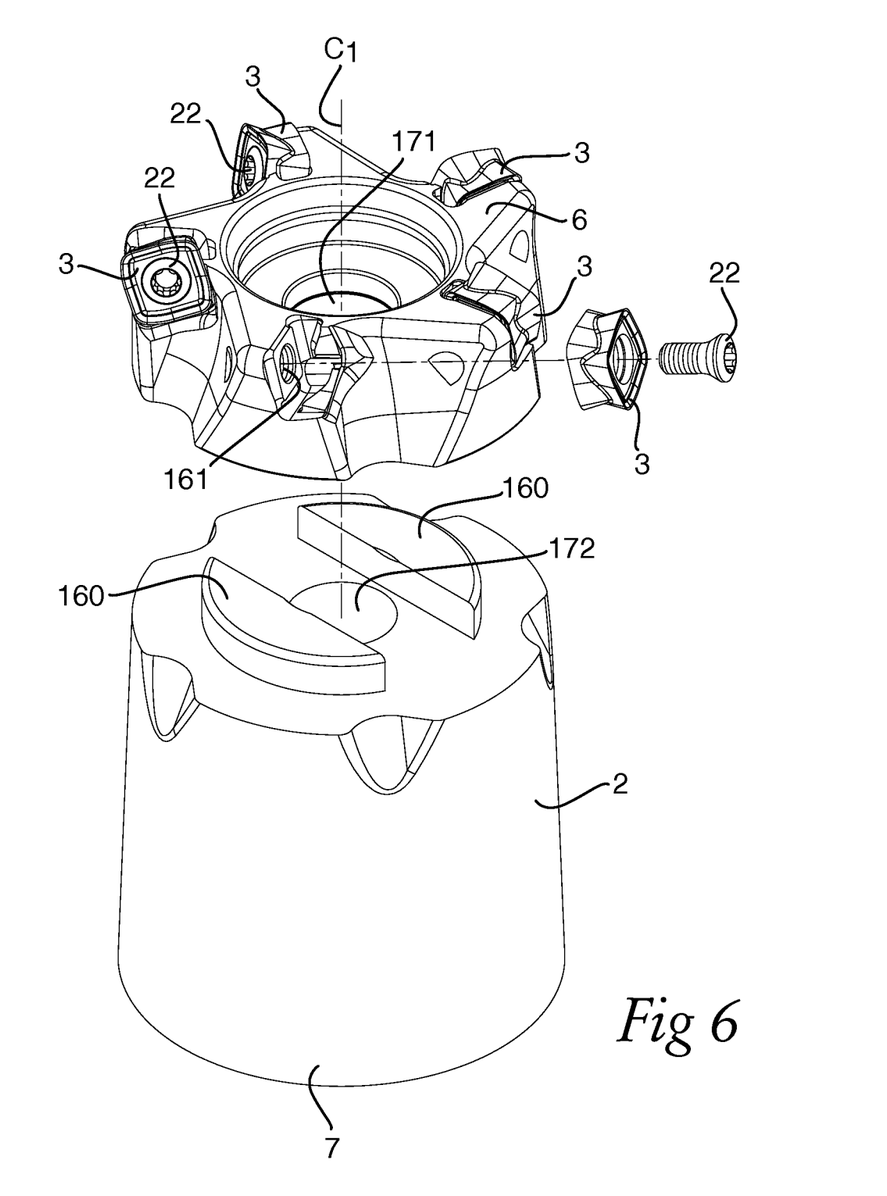
FIG. 6 is a schematic perspective view of another exemplifying embodiment of an exchangeable insert seat member according to the invention, showing an exchangeable insert seat member arranged for supporting five cutting inserts.

FIG. 6 discloses a third embodiment of the insert seat member 6 which differs from the first and second embodiment in that the exchangeable insert seat member 6 is arranged for five cutting inserts 3 and in that the insert seat member 6 forms the front portion of the milling tool. This insert seat member 6 is arranged for five cutting inserts 3. Each cutting insert 3 is arranged to be secured at the insert seat member 6 via a fastening screw 22. The fastening screw 22 is extending through a center hole 101 in the cutting insert 3 and into a fastening hole 161 of the insert seat member 6. The exchangeable insert seat member 6 is arranged to be rigidly fastened to the tool body 2 by means of protruding portions 160 of the tool body 2 and corresponding recesses (not shown) at the bottom surface of the insert seat member 6. The insert seat member 6 is secured at the tool body 2 via fastening elements through center holes 171, 172 extending along the axis C1 of rotation in the tool body 2.

The invention is not limited to the embodiments disclosed but may be varied and modified within the scope of the following claims. For instance the exchangeable insert seat member 6 can be adapted for any other cutting insert geometry for example a circular or a polygonal shape and the cutting insert can be negative or positive. The cutting insert 3 can be of any suitable shape and any size, for example with an inscribed circle of said cutting insert that has a diameter of 6, 12 or 15 mm. The cutting tool 1 can be a milling, drilling or turning cutting tool. Furthermore, the exchangeable insert seat member 6 can be designed for any other number of cutting inserts than the one, two or five presented in the examples above.

The invention claimed is:

1. An exchangeable insert seat member for a metal cutting tool comprising a tool body and a cutting insert, said exchangeable seat member comprising:
    a planar bottom surface for supporting a lower surface of the cutting insert;
    a center hole located in the planar bottom surface;
    a plurality of supporting side surfaces for supporting side portions of the cutting insert, wherein at least one of said plurality of supporting side surfaces is non-planar, wherein the exchangeable insert seat member is arranged to be placed between the tool body and the cutting insert;
    a first clearance surface; and
    a second clearance surface disposed between the first clearance surface and at least one of the plurality of supporting side surfaces, the second clearance surface being angled toward the center hole, wherein said exchangeable insert seat member contacting said tool body and said cutting insert at contact areas arranged such that there is no direct contact between the tool body and the cutting insert, and wherein said exchangeable insert seat member is produced by powder injection molding.

2. An exchangeable insert seat member according to claim 1, wherein said exchangeable insert seat member comprises one single piece.

3. An exchangeable insert seat member according to claim 1, wherein said exchangeable insert seat member is made of a material that comprises at least one selected from a group of Ni, Co, Cr, W, No and Fe.

4. An exchangeable insert seat member according to claim 1, wherein the at least one of the side portions of the cutting insert is non-planar and the at least one non-planar supporting side surface of said exchangeable insert seat member supports the at least one non-planar side portion of the cutting insert.

5. An exchangeable insert seat member according to claim 1, wherein said exchangeable insert seat member has at least two non-planar supporting surfaces for supporting of the cutting insert, and wherein at least one part of each of said two supporting surfaces is non-planar.

6. An exchangeable insert seat member according to claim 1, wherein the exchangeable insert seat member is arranged for holding at least one double positive cutting insert.

7. An exchangeable insert seat member according to claim 1, wherein said exchangeable insert seat member is at least partly coated by a surface coating.

8. An exchangeable insert seat member according to claim 1, wherein said exchangeable insert seat member is arranged for supporting at least two cutting inserts.

9. An exchangeable insert seat member according to claim 1, wherein said exchangeable insert seat member is arranged to constitute a front portion of the metal cutting tool when mounted to the tool body.

10. A metal cutting tool comprising:
    a tool body having a recess which comprises a seat for an exchangeable insert seat member; and
    an exchangeable insert seat member mounted in said seat and at least one cutting insert mounted on said exchangeable insert seat member, said exchangeable insert seat including a planar bottom surface for supporting a lower surface of the cutting insert, a center hole located in the planar bottom surface, a plurality of supporting side surfaces for supporting side portions of the cutting insert, a first clearance surface; and a second clearance surface disposed between the first clearance surface and at least one of the plurality of supporting side surfaces, the second clearance surface being angled toward the center hole, wherein at least one of said plurality of supporting side surfaces is non-planar, the exchangeable insert seat member being disposed between the tool body and the cutting insert, said exchangeable insert seat member contacting said tool body and said cutting insert at contact areas arranged such that there is no direct contact between the tool body and the cutting insert, and wherein said exchangeable insert seat member is produced by powder injection molding.

11. A metal cutting tool according to claim 10, wherein some of the contact areas between the exchangeable insert seat member and the recess of the tool body are planar.

12. A metal cutting tool according to claim 10, wherein said cutting insert and said exchangeable insert seat member are connected such that the areas of contact between them are located at three separated areas such that the cutting insert is supported in three different directions.

* * * * *